(12) United States Patent
Vaught

(10) Patent No.: US 7,937,460 B2
(45) Date of Patent: May 3, 2011

(54) SYSTEM AND METHOD FOR PROVIDING SERVICE LEVEL MANAGEMENT

(75) Inventor: Jeffrey A. Vaught, Batavia, OH (US)

(73) Assignee: Computer Associates Think, Inc., Islandia, NY (US)

(*) Notice: Subject to any disclaimer, the term of this patent is extended or adjusted under 35 U.S.C. 154(b) by 1487 days.

(21) Appl. No.: 10/886,781

(22) Filed: Jul. 7, 2004

(65) Prior Publication Data

US 2005/0010574 A1 Jan. 13, 2005

Related U.S. Application Data

(60) Provisional application No. 60/486,839, filed on Jul. 11, 2003.

(51) Int. Cl.
*G06F 15/173* (2006.01)
*G06F 15/02* (2006.01)
(52) U.S. Cl. ............... 709/223; 709/225; 705/32
(58) Field of Classification Search ............ 709/223, 709/225; 705/32
See application file for complete search history.

(56) References Cited

U.S. PATENT DOCUMENTS

| 6,058,102 | A | 5/2000 | Drysdale et al. | |
|---|---|---|---|---|
| 6,073,175 | A | 6/2000 | Tavs et al. | |
| 6,115,690 | A * | 9/2000 | Wong | 705/7 |
| 6,345,239 | B1 * | 2/2002 | Bowman-Amuah | 703/6 |
| 6,459,682 | B1 | 10/2002 | Ellesson et al. | |
| 6,643,612 | B1 | 11/2003 | Lahat et al. | |
| 6,690,929 | B1 | 2/2004 | Yeh | |
| 6,701,342 | B1 | 3/2004 | Bartz et al. | |
| 6,732,168 | B1 | 5/2004 | Bearden et al. | |
| 6,738,813 | B1 * | 5/2004 | Reichman | 709/224 |
| 6,745,242 | B1 | 6/2004 | Schick et al. | |
| 6,807,156 | B1 * | 10/2004 | Veres et al. | 370/252 |
| 6,816,882 | B1 * | 11/2004 | Conner et al. | 709/203 |
| 7,065,496 | B2 * | 6/2006 | Subbloie et al. | 705/11 |
| 7,349,958 | B2 * | 3/2008 | Chambliss et al. | 709/223 |
| 7,492,720 | B2 * | 2/2009 | Pruthi et al. | 370/252 |
| 2002/0087487 | A1 | 7/2002 | Hassinger | 705/400 |
| 2003/0217129 | A1 * | 11/2003 | Knittel et al. | 709/223 |
| 2004/0111709 | A1 * | 6/2004 | Furst et al. | 717/131 |

FOREIGN PATENT DOCUMENTS

EP 1 172 738 1/2002

OTHER PUBLICATIONS

Bhatti et al., "Web Server Support for Tiered Services", *IEEE Network*, vol. 13, No. 5, Sep./Oct. 1999, pp. 64-71.
D. Verma, et al, "Service Level Agreements and Policies," *In Proceedings*, Policy Workshop 1999, H-P Laboratories, Bristol, U.K., Nov. 1999, 7 pages <http://www-dse.doc.ic.ac.uk/events/policy-99/pdf/12-wijnen.pdf>.

* cited by examiner

*Primary Examiner* — Phuoc Nguyen
*Assistant Examiner* — Asghar Bilgrami
(74) *Attorney, Agent, or Firm* — Pillsbury Winthrop Shaw Pittman LLP

(57) ABSTRACT

A system and method for providing service level management in a web-based environment are provided. In one embodiment, the method includes intercepting a communication between a web-based environment and a client. The client is identified based, at least in part, on the communication. A web-based application is also identified based, at least in part, on the communication, with the web-based application associated with the web-based environment. The communication is processed using the identified web-based application. A real-time service level is determined for the identified client based, at least in part, on the processing of the communication by the web-based application.

26 Claims, 6 Drawing Sheets

SYSTEM AND METHOD FOR PROVIDING SERVICE LEVEL MANAGEMENT

RELATED APPLICATION

This application claims the priority under 35 U.S.C. §119 of provisional application Ser. No. 60/486,839 filed Jul. 11, 2003.

TECHNICAL FIELD

This disclosure relates generally to the field of network processing and, more specifically, to providing service level management.

BACKGROUND

Microsoft's .NET application is software that includes the .NET Framework, which is typically used for developing and running certain network-based or web-enabled applications and web services. These applications often operate over a network through standard, platform-independent protocols including, for example, extensible Markup Language (XML), Simple Object Access Protocol (SOAP), and Hypertext Transfer Protocol (HTTP). The .NET Framework often includes, references, or invokes, one or more HTTP modules and/or HTTP handlers, which are operable to suitably process HTTP, TCP, or other requests. Once an HTTP (or other similar protocol) request is received, the request may be processed by multiple HTTP modules and processed by a single HTTP handler. HTTP modules allow developers or administrators to intercept, perform custom processing on, or modify particular requests. HTTP modules often implement the IHttpModule interface, which is located in the System.Web namespace. HTTP handlers are generally operable to process endpoint requests. For example, HTTP handlers enable the.NET Framework to process HTTP URLs within a web-enabled or .NET-compatible application. HTTP handlers normally implement the IHttpHandler interface, which is also located in the System.Web namespace.

SUMMARY

A system and method for providing service level management in a web-based environment are provided. In one embodiment, the method includes intercepting a communication between a web-based environment and a client. The client is identified based, at least in part, on the communication. A web-based application is also identified based, at least in part, on the communication, with the web-based application associated with the web-based environment. The communication is processed using the identified web-based application. A real-time service level is determined for the identified client based, at least in part, on the processing of the communication by the web-based application. The details of one or more embodiments of the disclosure are set forth in the accompanying drawings and the description below. Other features, objects, and advantages of the disclosure will be apparent from the description and drawings, and from the claims.

DETAILED DESCRIPTION

Figure 1:
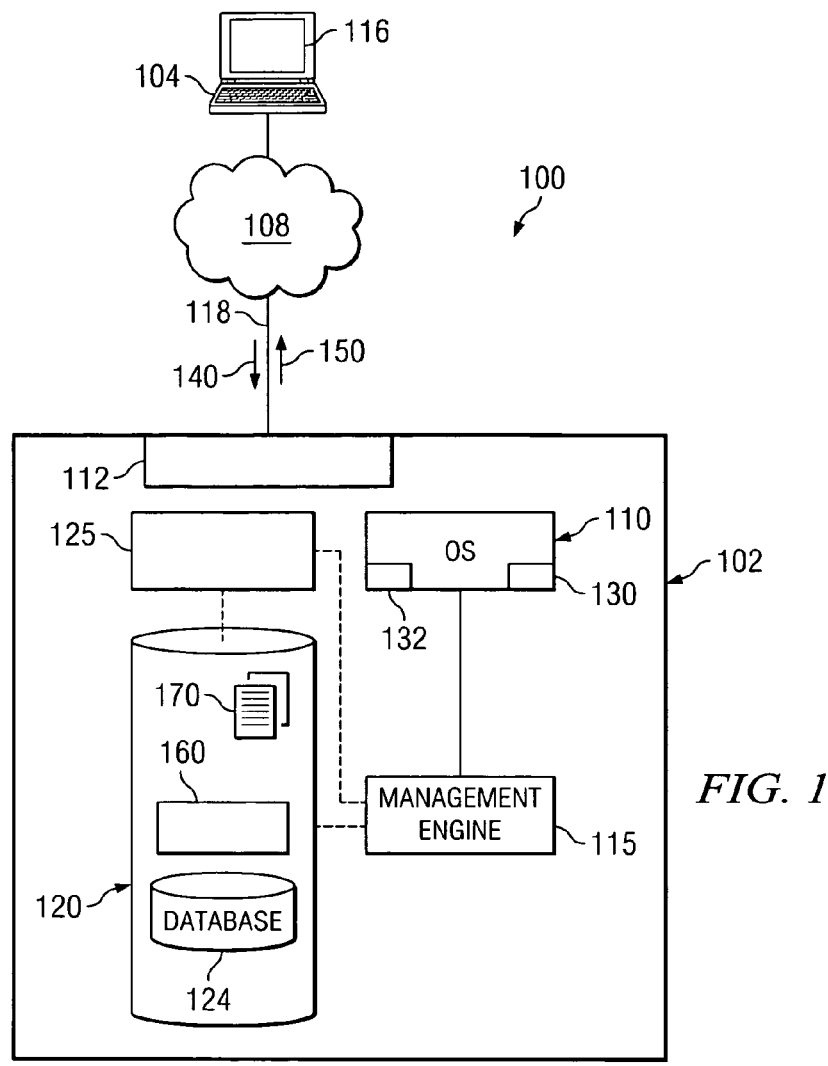
FIG. 1 illustrates a system for providing service level processing and reporting in a web-based environment according to certain embodiments of the disclosure.

FIG. 1 illustrates a system for service level reporting for applications and web services in a network framework (or other web-enabled environment) according to certain embodiments of the disclosure. At a high level, system 100 is a client/server environment comprising at least one client or management workstation 104, a server or host 102, and network 108, but may also be a standard or local computing environment or any other suitable environment. For example, system 100 may include or host a network framework or web-based environment. In general, system 100 allows a customer to request a particular web-enabled application 160 or method, dynamically determines the customer from request 140, and automatically provides various administration, billing, and reporting abilities based on this request 140. More specifically, server 102 may provide a plurality of applications 160 for a particular fee, monitor the service level of various requests 140 for the provided applications 160, and debit/credit a customer's account based on requests 140 and the determined service level. The term "automatically," as used herein, generally means that the appropriate processing is substantially performed by at least part of system 100. It should be understood that "automatically" further contemplates any suitable user or administrator interaction with system 100 without departing from the scope of this disclosure. The term "dynamically," as used herein, generally means that certain processing is determined, at least in part, at run-time based on one or more variables.

Server 102 includes memory 120 and processor 125 and comprises an electronic computing device operable to receive, transmit, process and store data associated with system 100. Server 102 may comprise a general-purpose personal computer (PC), a Macintosh, a workstation, a Unix-based computer, a server, or any other suitable device. For example, server 102 may be a blade server or a web server. In short, server 102 may comprise software and/or hardware in any combination suitable process requests 140 and provide service level reports 150 based on these requests 140. FIG. 1 only provides one example of computers that may be used with the disclosure. For example, although FIG. 1 provides one example of server 102 that may be used with the disclosure, system 100 can be implemented using computers other than servers, as well as a server pool. The present disclosure contemplates computers other than general purpose computers as well as computers without conventional operating systems. In other words, as used in this document, the term "computer" is intended to encompass any suitable processing device. Computer server 102 may be adapted to execute any operating system 110 including Windows NT, Windows 2000, Windows Server, Windows Storage Server, Windows XP home or professional, Unix, Linux, or any other suitable operating system including, referencing or linking to an extensible instrumentation layer 130 and an event tracer 132. In one embodiment, operating system 110 includes a network framework, such as Microsoft's .NET framework.

Extensible instrumentation layer 130 exposes namespaces, classes, methods, and properties for hardware devices, operating system 110, and various applications 160. For example, extensible instrumentation layer 130 may be Windows Management Instrumentation (WMI). Event tracer 132 is any module operable to provide a high-performance, commonly available ability to issue and format tracing events. Event tracer 132 may be controlled by tracelog functions including StartTrace( ), EndTrace( ), and UpdateTrace( ), as well as others. For example, event tracer 132 may log or write and suitable information or data associated with service levels, such as the time of the event, a process ID under which the event occurs, thread ID under which the event occurs, a user-mode CPU time, and/or kernel-mode CPU time.

Memory 120 may include any hard drive, memory, or database module and may take the form of volatile or non-volatile memory including, without limitation, magnetic media, optical media, random access memory (RAM), read-only memory (ROM), removable media, or any other suitable local or remote memory component. In this embodiment, illustrated memory 120 includes database 124, at least one web-enabled application 160, and one or more customer accounts 170, but may also include any other appropriate data. For example, memory may include fee tables and service level threshold tables. Database 124 stores one or more database tables, with each table including one or more columns. Database 124 may receive records, schemas, or any other suitable data through interface 112 or from another process running on server 102. In one embodiment, database 124 may be a relational database management system (or DBMS). Relational databases often use sets of schemas to describe the tables, columns, and relationships between the tables using basic principles known in the field of database design. But while described as a relational database, database 124 may be any data repository of any suitable format including XML documents, flat files, Btrieve files, comma-separated-value (CSV) files, an object oriented database, name-value pairs, and others.

Figure 3:
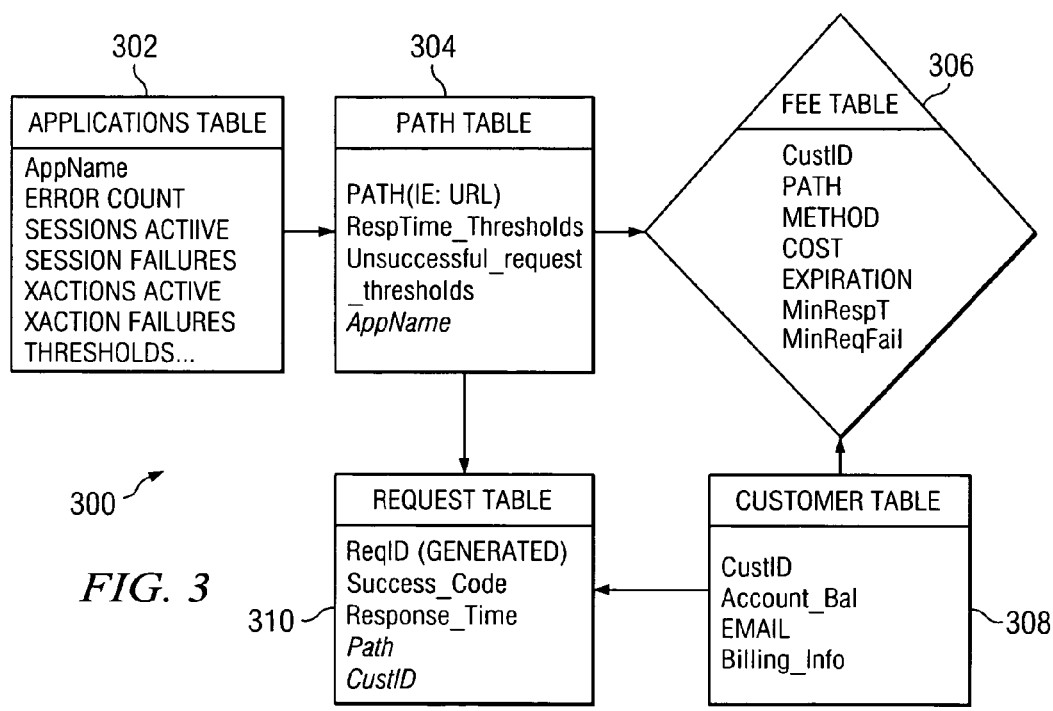
FIG. 3 illustrates an example entity-relationship diagram of at least a portion of data used for providing service level processing and reporting in a web-based environment.

Applications 160 include any standard or custom .NET-compatible or web-enabled software (including ASP.NET applications, remoting applications, and particular web services) associated with a web-based environment, such as Microsoft's .NET framework. Each application 160 may be written or developed in any appropriate language such as C, C++, C#, Java, J#, and VB.NET. Typically, server 102 offers applications 160 for use by clients 104 based on predetermined account information. Memory 120 also stores one or more customer accounts 170. Customer account 170 generally includes or references associated applications 160, account balances, and service level parameters or thresholds. Each customer account 170 may be an XML document, a table or record in database 124, a binary file, a text file, a CSV file, an object, an array, or any logical or physical component operable to store information associated with a customer requesting application 160. Indeed, as illustrated in FIG. 3, customer account 170 may include a plurality of tables (or files), with each table associated with a portion of the account. For example, customer account 170 may include a first table associated with account management and a second table associated with a customer's service level parameters. Further, it will be understood that customer account 170 may be local or remote, as well as temporary or persistent, without departing from the scope of the disclosure.

Server 102 also includes processor 125. Processor 125 executes instructions and manipulates data to perform the operations of server 102 such as, for example, a central processing unit (CPU), an application specific integrated circuit (ASIC) or a field-programmable gate array (FPGA). Although FIG. 1 illustrates a single processor 125 in server 102, multiple processors 125 may be used according to particular needs, and reference to processor 125 is meant to include multiple processors 125 where applicable. In the embodiment illustrated, processor 125 executes management engine 115 that processes requests and reporting on service levels in system 100. Management engine 115 could include any hardware, software, firmware, or combination thereof operable to receive or intercept communications between server 102 and client 109. For example, management engine 115 may provide client 104 with supervisory or account management views (such as account balance, selected assemblies and methods, service levels, and others. It will be understood that while management engine 115 is illustrated as a single multi-tasked module, the features and functionality performed by this engine may be performed by multiple local or distributed modules such as, for example, an HTTP module, an account management module, a correlator, and a user interface module. Moreover, while not illustrated, management engine 115 may be a child or sub-module of any other appropriate software module, such as an enterprise infrastructure management application, without departing from the scope of this disclosure.

Server 102 also often includes interface 112 for communicating with other computer systems, such as client 104, over network 108 in a client-server or other distributed environment via link 118. Network 108 facilitates wireless or wireline communication between computer server 102 and any other computer. Network 108 may communicate, for example, Internet Protocol (IP) packets, Frame Relay frames, Asynchronous Transfer Mode (ATM) cells, voice, video, data, and other suitable information between network addresses. Network 108 may include one or more local area networks (LANs), radio access networks (RANs), metropolitan area networks (MANs), wide area networks (WANs), all or a portion of the global computer network known as the Internet, and/or any other communication system or systems at one or more locations. Generally, interface 112 comprises logic encoded in software and/or hardware in a suitable combination and operable to communicate with network 108. More specifically, interface 112 may comprise software supporting one or more communications protocols associated with communications network 108 or hardware operable to communicate physical signals.

Client 104 comprises any computer and may include input devices, output devices, mass storage media, processors, memory, interfaces, communication ports, or other appropriate components for receiving commands from and present at to the user of client 104. It will be understood that there may be any number of clients 104 coupled to server 102 or client 104 may comprise a management component of server 102. Moreover, "client 104," "user of client 104," and "customer" may be used interchangeably as appropriate without departing from the scope of this disclosure. Moreover, a customer may be am organization, business, or enterprise with a number of clients 104 and users. As used in this document, client 104 is generally intended to encompass a personal computer, workstation, network computer, kiosk, wireless data port, personal data assistant (PDA), one or more processors within these or other devices, or any other suitable processing or display device or software. For example, client 104 may comprise a computer that includes an input device, such as a keypad, touch screen, mouse, or other device that can accept information, and an output device that conveys information associated with the operation of server 102 or clients 104, including digital data, visual information, or reports 150.

Both the input device and output device may include fixed or removable storage media such as a magnetic computer disk, CD-ROM, or other suitable media to both receive input from and provide output to users of clients 104 through a portion of the output device, namely graphical user interface (GUI) 116.

GUI 116 comprises a graphical user interface operable to allow the user of client 104 to interface with system 100 and view the reports of service level performance of a plurality of software products and application 160. Generally, GUI 116 provides the user of client 104 with an efficient and user-friendly presentation of data provided by system 100, such as a display or report 150 based on applications 160. GUI 116 may comprise a plurality of displays having interactive fields, pull-down lists, and buttons operated by the user. In one example, GUI 116 presents formatted output to and receives commands from client 104. It should be understood that the term graphical user interface may be used in the singular or in the plural to describe one or more graphical user interfaces and each of the displays of a particular graphical user interface. Further, GUI 116 contemplates any graphical user interface, such as a generic web browser, that processes information in system 100 and efficiently presents the information to the user. Server 102 can accept data from client 104 via the web browser (e.g., Microsoft Internet Explorer or Netscape Navigator) and return the appropriate HTML or eXtensible Markup Language (XML) responses. For example, GUI 116 may comprise a front-end of management engine 115, with the front-end operable to view account balances historical service levels. Accordingly, for ease of understanding, the term GUI 116 and management engine 115 may be used interchangeably; although, it will be understood that management engine 115 will often include more functionality than a graphical user interface.

In one aspect of operation, management engine 115 receives or otherwise intercepts a request 140 between client 104 and server 102. For example, request 140 may comprise a URL, an HTTP POST, or any other suitable communication. Once retrieved, management engine 115 identifies the customer (or client 104) that communicated the intercepted request 140. In one embodiment, management engine 115 is operable to identify client 104 through a form, a window, a passport, private cookie authentication, or other appropriate technique. For example, management engine 115 may identify an IP address from request 140 and compare the IP address to an IP mask to identify an address of the client machine. In another example, management engine 115 may implement a "set cookie" command prior to intercepting a request and then determining a password for the customer from the cookie installed on client 104. In yet another example, management engine 115 may identify the client from HTTP POST data.

Once a client has been suitably identified, management engine 115 accesses customer account 170 using the client or customer identification. Management engine 115 then identifies the customer's account balance, service level parameters and thresholds, associated applications 160, and any other suitable information. According to one embodiment, management engine 115 may automatically communicate an alert to system administrators if the customer's account balance is insufficient for to satisfy request 140. Further, management engine 115 may deny request 140 if the customer has insufficient funds. Once this request 140 has been authenticated and the account information gathered, management engine 115 manages or monitors the execution of request 140 to determine at least one real-time service level for the process. Next, management engine 115 compares the real-time service level to the service level thresholds stored in customer account 170. Management engine 115 may then assign a monetary value to request 140 based on predetermined fees, determine a chargeback value if the real-time service level fails to meet the service level thresholds, and debit or credit the customer's account balance in customer account 170 based on these values. At any suitable time, management engine 115 may also generate reports, graphs, or other presentations of the service level data and communicate these outputs 150 to client 104.

Figure 2:
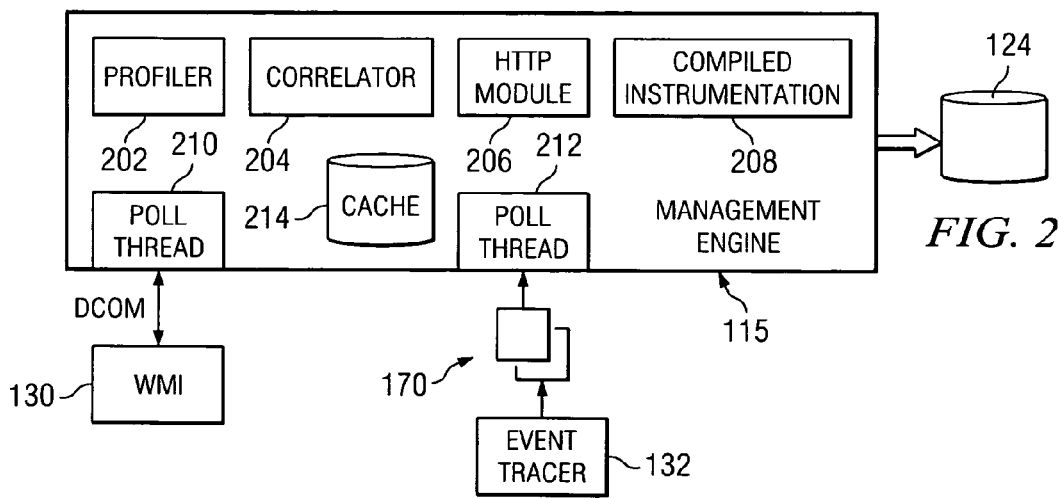
FIG. 2 illustrates a data flow diagram using an example embodiment of the management engine illustrated in FIG. 1.

FIG. 2 is data flow diagram including an example embodiment of management engine 115 generally illustrated in FIG. 1. At a high level, FIG. 2 illustrates the flow of information between management engine 115, database 124, example WMI 130, and event tracer 132. In this embodiment, management engine 115 includes profiler 202, correlator 204, HTTP plug-in 206, compiled instrumentation 208, poll thread 210, and pull thread 212. While illustrated as internal to management engine 115, it will be understood that each of these components may individually or collectively be a callable remote function, a service, a dynamic-linked library (DLL), a daemon, a Component Object Model (COM) function, or any other local or remote function, method, object, or sub-module. Moreover, the functionality of these various components may be executed by one component without departing from the scope of the disclosure.

Profiler 202 generally implements profiler techniques and algorithms such as callbacks and providing a user with in-depth instrumentation involving web-enabled application 160. For example, profiler 202 may be a COM server that implements callbacks such as "class load started," "class load finished," "function entered," "function leave," and many others. In certain embodiments, these callbacks are instrumented using event tracer 132. Profiler 202 may include a profile mask operable to identify or determine active profiler functions. Profiler 202 may include a thread that listens for a "profiler notification" message operable to instruct profiler 202 to reload a configuration file and reset the mask based on this reload. Moreover, profiler 202 may be registered or coded as a provider, or a source of information associated with an event, with event tracer 132. Correlator 204 is an example component operable to i) collect, gather, or combine one or more event tracing logs 170; ii) correlate start and end events included in event tracing logs 170; iii) certain chargeback functions; and iv) generate database-compliant data structures based on event tracing logs 170. Correlator 204 may be further operable to identify and process individual records or entries in event tracing log 170 to perform function name processing and/or to efficiently correlate the start/end events. As described above, correlator 204 may be implemented as a plurality of plug-ins or DLLs without departing from the scope of this disclosure.

HTTP module 206 (or plug-in) is operable to monitor, track, or otherwise process ASP.NET and web services. HTTP module is further operable to intercept requests 140, responses, or other communications between client 104 and server 102 (or an associated web-based environment). For example, HTTP module 206 may implement an iHTTPModule interface and present "OnBeginRequest" and "OnEndRequest" functions and may be enabled by an <httpModules> tag. In another example, HTTP module 206 may intercept incoming and outgoing communications to identify customers and clients 104, determine real-time service levels, and others. In one embodiment, HTTP module 206 may be further operable to monitor or process Transmission Control Protocol (TCP) or other protocol requests. Compiled instrumentation 208 is any component operable to easily instrument or manage internal applications or new .NET applications 160. Poll thread 210 is any plug-in or sub-module operable to poll WMI 130 for certain metrics such as, for example, number of compilations, number of sessions, number of applications, and many others. Typically, these metrics are converted to database-compliant data structures and inserted in to database 124. Pull thread 212 is any plug-in or sub-module operable to locate, identify, or otherwise retrieve or process event tracing logs.

FIG. 3 illustrates an example entity-relationship (E/R) diagram 300 of one embodiment of data structures used for providing service level management and reporting in a web-based environment. Illustrated ER diagram 300 includes five example tables: applications table 302, path table 304, request table 306, customer table 308, and fee table 310. It will be understood that these tables are for illustration purposes only and any number of tables, including any number of fields and in any particular format, may be used without departing from the scope of this disclosure. Further, it will be understood that the data illustrated in diagram 300 may be partially or entirely included or stored in customer account 170. Returning to the illustrated embodiment, applications table 302 includes a list of a plurality of available applications 160. For example, applications table 302 may include one entry for an ASP.NET application and a second entry for a web service. Applications table 302 may also include data such as current sessions, error counts, and associated service level parameters and thresholds. Table 302 may be automatically populated on system startup and accessible to one or more customers. Example path table 304 includes any system path, location, or other appropriate command for locating or executing application 160. Path table 304 may also include response time and unsuccessful request thresholds. Request table 306 may store management information including request ID (which may be generated by server 102), a success code, response time for filling a particular request 140, and links or references to path table 304 and customer table 308. Customer table 308 may include a customer ID or client ID, an account balance, an email or other contact information, and billing information. Each record may be generated or populated during an account setup session by customer interested in accessing applications. Fee table 310 may include a plurality of records, with each record associating a customer, an application 160 or method, and the costs for the customer to execute that method. For example, illustrated fee table 310 includes a customer ID, a path, method identifier, cost, a minimum response time threshold, and a minimum failing requests threshold. In one embodiment, fee table 310 may be input by an administrator or salesman after negotiations with the customer. Of course, the various thresholds included in the tables illustrated (including session failures, option failures, response time, unsuccessful requests, and others) may be stored in one threshold table without departing from the scope of this disclosure.

Figure 4:
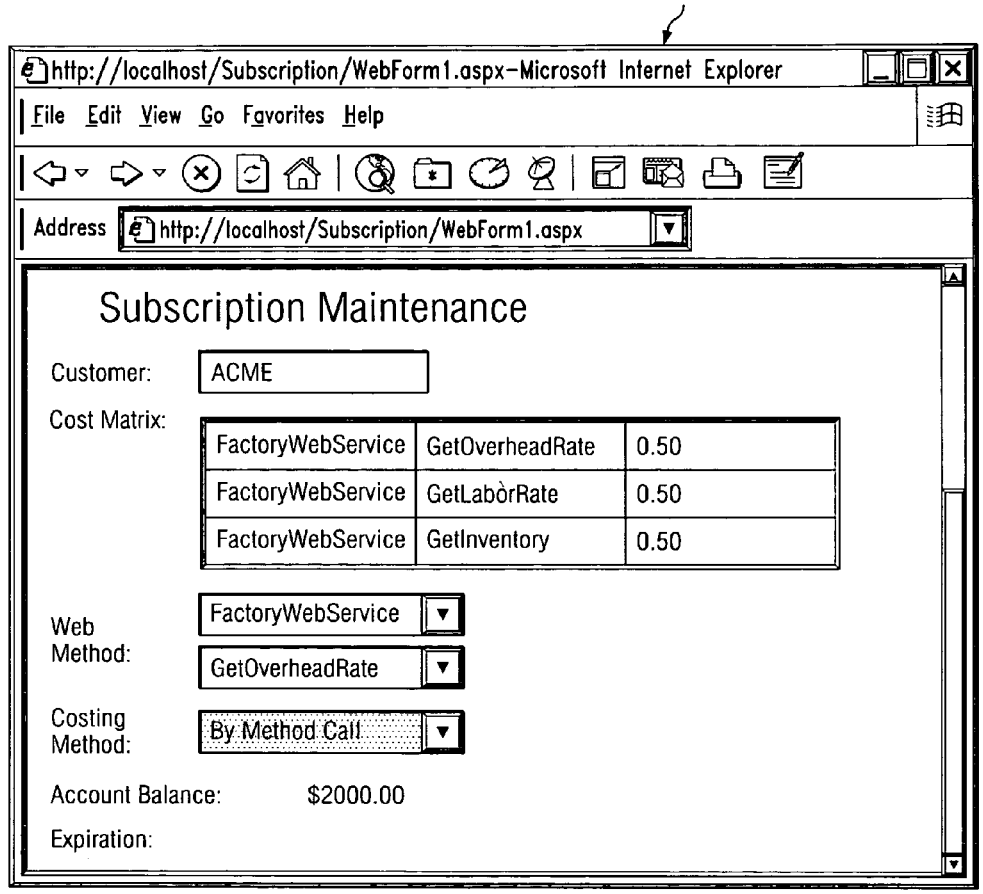
FIG. 4 illustrates an example view presented by one of the graphical user interfaces used by the system of FIG. 1.

FIG. 4 illustrates an example view presented by one of the graphical user interfaces used by the system of FIG. 1. It will be understood that this view is for illustration purposes only. System 100 may utilize or present any graphical display or element in any format, with any suitable data, without departing from the scope of this disclosure. Illustrated view 116 provides client 104 with a subscription maintenance screen. This subscription maintenance screen may contain a child page of an overall login screen or account maintenance screen. Example view 116 includes customer name or ID, a list or matrix of associated applications 160, drop down lists for assemblies or methods, a customer chargeback type or other billing method, the customer's account balance, and an expiration date (if any). As illustrated, the cost matrix includes one assembly (factorywebservice) and three methods: GetOverheadRate, GetlaborRate, and GetInventory. Each of the example methods costs the example customer (ACME) 50 cents per request 140. This can be determined using the costing method "by method call." Each request 140 may then subtract 50 cents from the customer's current example balance of $2,000.00. Further, while not illustrated, a real-time service level for executing one of these methods may result in a chargeback to the customer's account balance and reported to the customer using view 116.

Figure 5A:
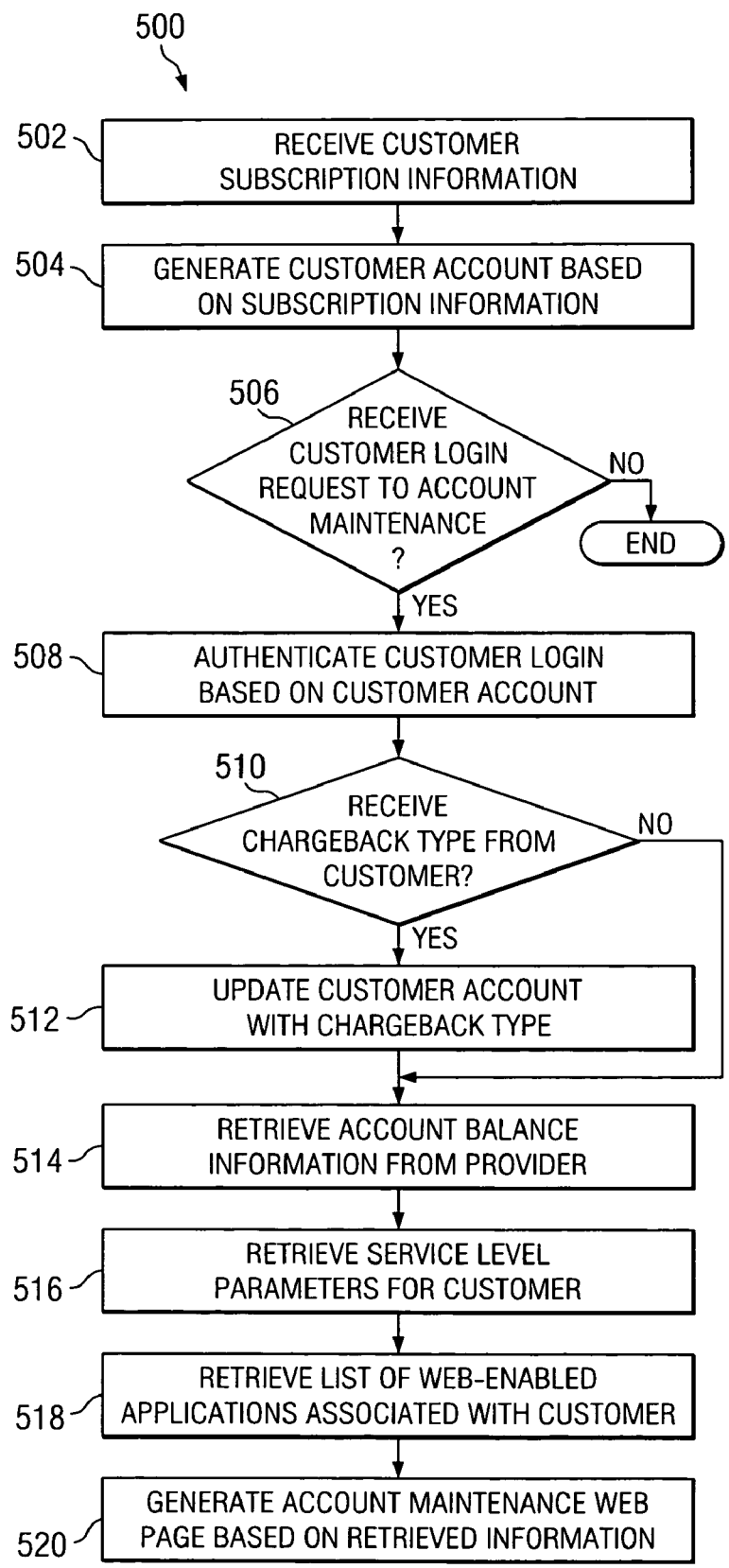
FIGS. 5A-C illustrate example methods for providing service level processing and reporting in a web-based environment according to certain embodiments of the disclosure.

FIGS. 5A and B illustrate example methods for providing service level establishment, management, and reporting in a web-based environment according to certain embodiments of the disclosure. FIG. 5A illustrates method 500, which generally described establishment and management of a customer account 170 and service level thresholds associated with web-enabled applications 160. Method 500 begins at step 502, where server 102 receives customer subscription information. This customer subscription information may be received using any suitable technique including HTML posts, forms, and others. Once received, management engine 115 uses the customer subscription information to generate one or more customer account records 170 at step 504.

This account generation may include any appropriate processing such as initialization of account balances, population of default values (fees, chargeback type, applications 160, etc.), and such. At any subsequent time, server 102 may receive a customer login request to an account maintenance subsystem or web page at decisional step 506. If received, then at step 508 management engine 115 may authenticate the customer login using the login request and information from customer account 170. Next, at decisional step 510, management engine 115 determines if a chargeback type is received from the customer to replace a possible default. For example, as described above, the chargeback type may comprise any billing category including "by method," "monthly," "weekly," and others. If a new chargeback type is received, the management engine 115 updates customer account 170 with the received chargeback type at step 512. Next, or if there is no chargeback type received, management engine 115 retrieves account balance information from any suitable provider at step 514. For example, management engine 115 may retrieve or receive account balance information using a passport system. In another example, management engine 115 may include the account balance information in a subsystem or component stored in server 102. Next, management engine 115 retrieves service level parameters and thresholds for the customer. As described above, the service level parameters may be stored in customer account 170 or in other local or remote tables. Management engine 115 then retrieves a list of web-enabled applications 160 associated with the customer at step 518. This list of desired web-enabled applications 160 may have been selected by the customer during account generation. This list may also be dynamically generated based upon customer input. Once the information has been retrieved, management engine 115 generates at least one account maintenance web page or frame at step 520 for presentation to the customer through client 104.

Figure 5B:
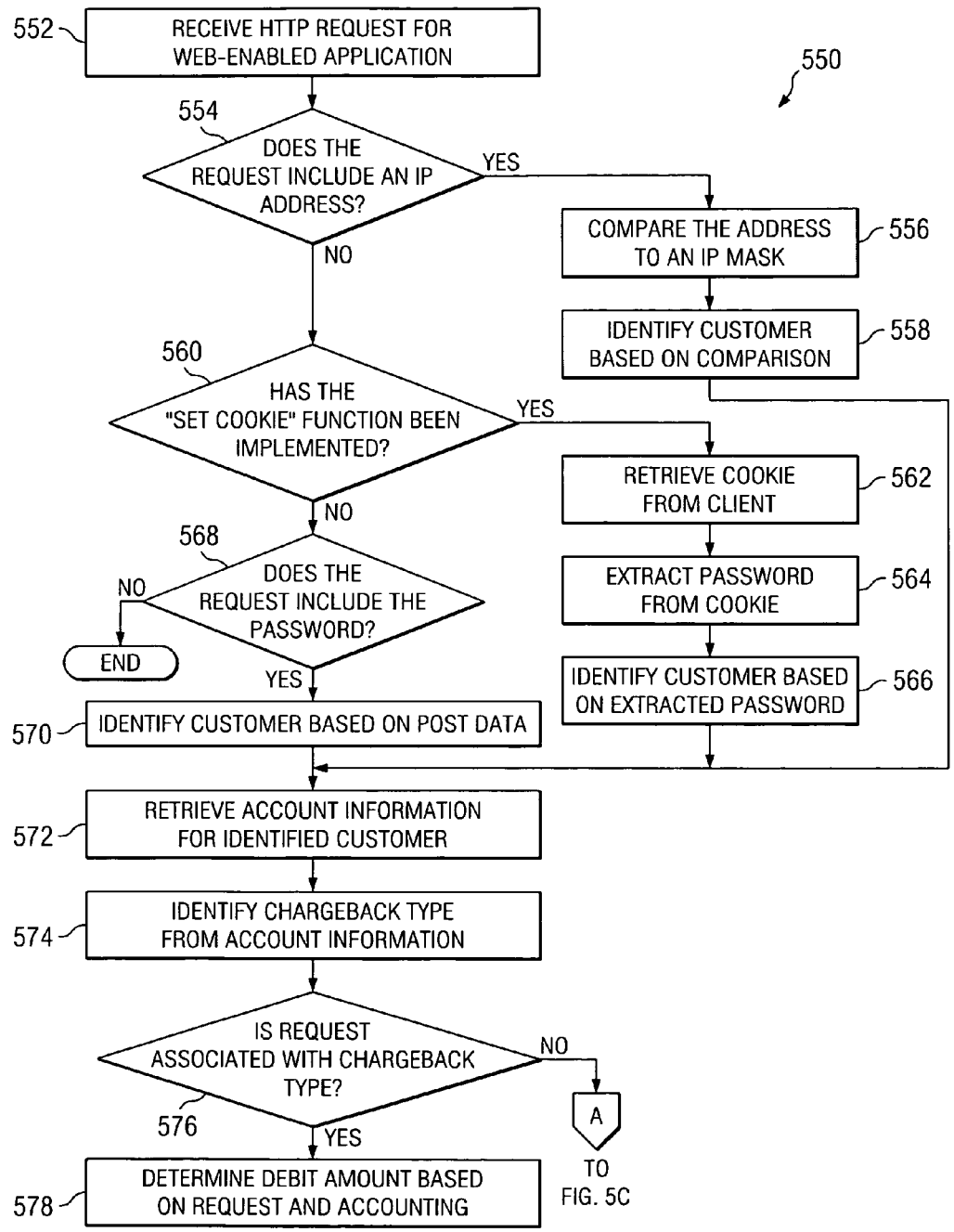
Figure 5C:
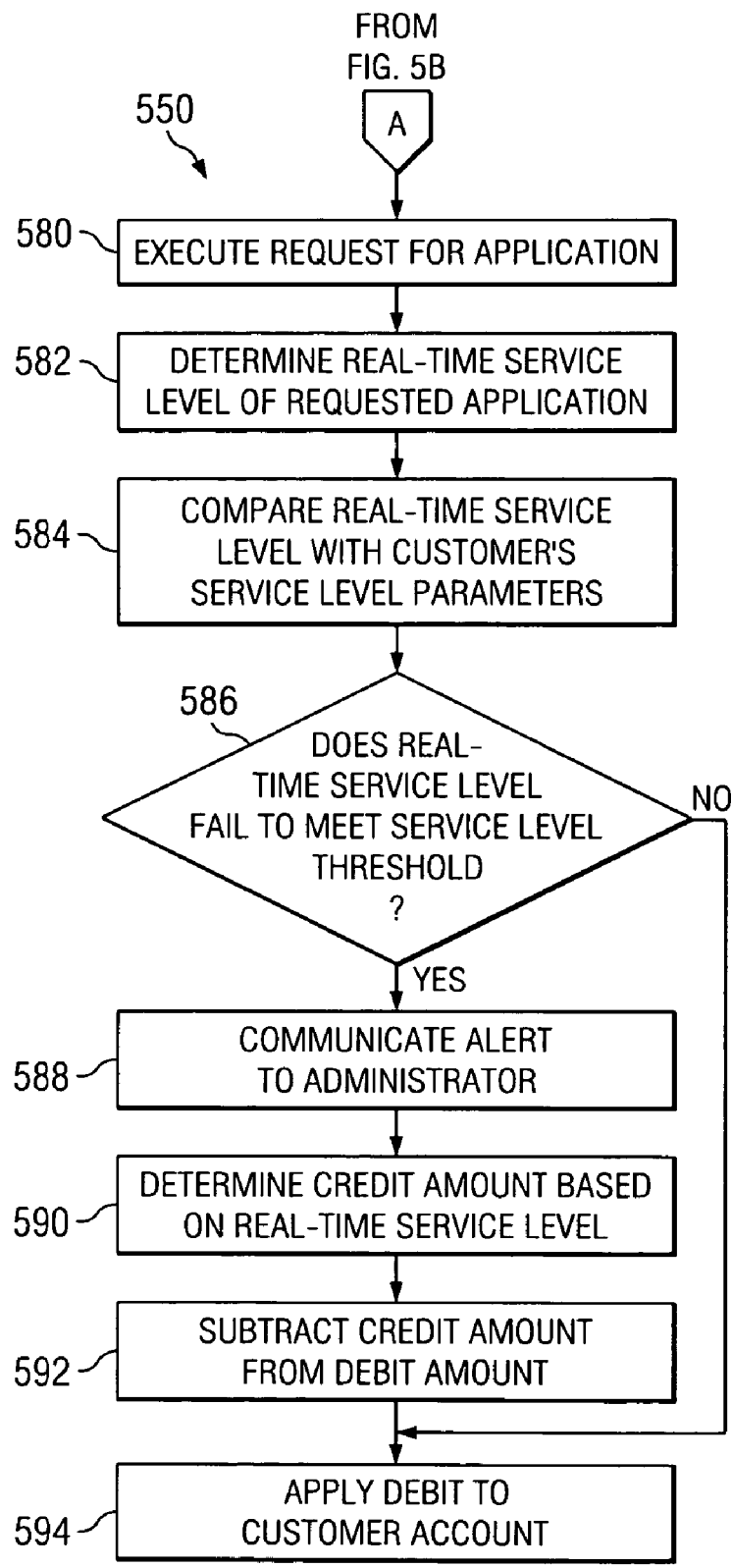

FIGS. 5B-C illustrate method 550, which generally describes server 102 providing web-enabled applications 160 for use by customers and management engine 115 reporting, managing, and billing based on determined service levels for this provision. Method 550 begins at step 552, when server 102 receives an HTTP request 140 for web-enabled application 160 from client 104. While described as HTTP, it will be understood that request 140 may be TCP or any other appropriate format or protocol without departing from the scope of this disclosure. Next, in example steps 554 through 570, management engine 115 attempts to identify the customer based on the received request 140. For example, at decisional step 554, management engine 115 determines if request 140 includes an IP address. If it does, management engine 115 compares the IP address to an IP mask at step 556. Based on this comparison, management engine 115 identifies the customer using client 104. If a request does not include an IP address, then management engine 115 determines if server 102 has implemented the "set cookie" function. If it has, then management engine 115 retrieves a cookie from client 104 and extracts a password or other identifier from the retrieved cookie at step 564. Based on this extracted password, management engine 115 identifies the customer using client machine 104. If the "set cookie" function was not implemented or a cookie was not retrieved, then management engine 115 determines if request 140 includes the password at decisional step 568. If it does not, then management engine 115 determines that it is currently unable to identify the customer using the disclosed techniques. Of course, while not illustrated, management engine 115 may use other techniques for identifying the customer including extracting a customer ID or password from the form, window, and others. If request 140 does include the password, then management engine 115 identifies the customer based on the HTTP POST data at step 570.

Once the customer has been identified and/or authenticated using any appropriate technique, management engine 115 retrieves information from the appropriate customer account 170 at step 572. Next, management engine 115 identifies the chargeback type for the customer using customer account 170. Management engine 115 then determines if request 140 is associated with the chargeback type at decisional step 576. For example, the requesting customer may be associated with a chargeback type of "per method." Based on this, management engine 115 is able to determine that request 140 includes the method and that the customer should be billed for this request 140. If request 140 is associated with the predetermined chargeback type, then management engine 115 determines the monetary value or other debit amount based on request 140 and the account information at step 578. If the request is not associated with the chargeback type (for example, if the chargeback type is "per month") or once the debit amount has been determined, then server 102 executes request 140 for web-enabled application 160 at step 580. It will be understood that the debit amount may be initialized to zero resulting in a zero dollar debit amount for request 140 if it is not associated with the chargeback type. Management engine 115 then determines a real-time service level for the execution of requested application 160 at step 582. This real-time service level determination may include monitoring execution of requests 140 to identify any criteria including response time, error counts, and others. Next, at step 584, management engine 114 compares the determined real-time service level with the customer's service level parameters and thresholds. If the real-time service level fails to meet the customer's service level threshold at decisional step 586, then management engine 115 automatically communicates an alert to a system or network administrator at step 588. Next, management engine 115 may determine a credit amount based on the real-time service level and then subtracts the determined credit amounts from the currently used debit amount at step 592. Next, at step 594, management engine 115 applies the determined debit amount to the customer's account 170.

Although this disclosure has been described in terms of certain embodiments and generally associated methods, alterations and permutations of these embodiments and methods will be apparent to those skilled in the art. For example, management engine 115 and/or HTTP module 206 may be operable to process TCP requests, XML requests, or any communication according to any other suitable protocol such that the customer's service level may be determined. Accordingly, the above description of example embodiments does not define or constrain this disclosure. Other changes, substitutions, and alterations are also possible without departing from the spirit and scope of this disclosure.

What is claimed is:

1. A method for service level processing of a web-based application associated with a web-based environment comprising:
   intercepting, at a management engine, a request from a client that is addressed to the web-based application, wherein the request is not addressed to the management engine;
   identifying, by the management engine, the client based, at least in part, on the request;
   identifying, by the management engine, the web-based application based, at least in part, on the request;
   retrieving, by the management engine, predefined account information regarding the identified client;
   determining, at the management engine, whether to process the request, wherein the determination is based, at least in part, on the predefined account information and the intercepted request;
   allowing the request to be processed by the web-based application when it is determined that the request is to be processed;
   monitoring, at the management engine, processing of the request by the web-based application;
   determining, at the management engine, a real-time service level for the processing of the request based on the monitoring; and
   assigning a monetary value to the processing of the request based, at least in part, on the predefined account information and the real-time service level.

2. The method of claim 1, the request comprising an hypertext transfer protocol (HTTP) request from the client.

3. The method of claim 1, the real-time service level comprising at least one of the following:
   response time;
   unsuccessful request;
   session failures;
   method failures; or
   error count.

4. The method of claim 1, wherein the client account information comprises a list of a plurality of web-based applications for use by the client, the plurality of web-based applications including the web-based application.

5. The method of claim 1, wherein the client account information comprises an account balance for the client and a predetermined fee for processing the request, the method further comprising:
   communicating an alert when the predetermined fee exceeds the account balance.

6. The method of claim 5, wherein determining whether to process the request includes determining whether the predetermined fee exceeds the account balance.

7. The method of claim 5, wherein the one or more processors configured to determine whether to process the request are further configured to determine whether the predetermined fee exceeds the account balance.

8. The method of claim 1, wherein the client account information comprises at least one service level parameter for determining whether a service level associated with processing the request is acceptable, the method further comprising:
comparing the real-time service level to the at least one service level parameter; and
determining whether the real-time service level is acceptable based on the comparison.

9. The method of claim 8, the client comprising a customer and the method further comprising:
when it is determined that the real-time service level is unacceptable, determining a monetary value based on the unacceptable determination and a predetermined fee associated with processing the request, and
determining a chargeback for the customer based, at least in part, on the monetary value.

10. The method of claim 9, further comprising:
updating an account balance for the customer based on the chargeback; and
communicating the real-time service level and the account balance to the customer.

11. The method of claim 1, wherein monitoring processing the request by the web-based application to the client includes receiving, from at least one event tracer, at least one event tracing log that includes data regarding processing the request and wherein determining a real-time service level based on the monitoring includes correlating the data regarding processing the request.

12. The method of claim 11, wherein the data regarding processing the request includes data regarding identification of one or more processes associated with processing the request, start events associated with at least one of the one or more processes, and end events associated with at least one of the one or more processes, and wherein the start events and end events are used, at least in part, to determine the real-time service level.

13. The method of claim 1, wherein intercepting a request from a client further includes an HTTP module monitoring and detecting communications to the web-based application.

14. A system for service level reporting of a web-based application associated with a web-based environment comprising:
one or more processors providing a management engine configured to:
intercept a request from a client that is addressed to a web-based application,
wherein the request is not addressed to the management engine;
identify the client based, at least in part, on the request;
identify the web based application based, at least on part, on the request;
retrieving predefined account information regarding the identified client;
determine whether to process the request, wherein the determination is based, at least in part, on the predefined account information and the intercepted request;
allow the request to be processed by the web-based application when it is determined that the request is to be processed;
monitor processing of the request by the web-based application;
determine a real-time service level of processing of the request based on the monitoring; and
assigning a monetary value to processing of the request based, at least in part, on the predefined account information and the real-time service level.

15. The system of claim 14, the request comprising an hypertext transfer protocol (HTTP) request from the client.

16. The system of claim 14, the real-time service level comprising at least one of the following:
response time;
unsuccessful request;
session failures;
method failures; or
error count.

17. The system of claim 14, wherein the client account information comprises a list of a plurality of web-based applications for use by the client, the plurality of web-based applications comprising the web-based application.

18. The system of claim 14, wherein the client account information comprises an account balance for the client and a predetermined fee for processing the request, the one or more processors further configured to:
communicate an alert when the predetermined fee exceeds the account balance.

19. The system of claim 14, wherein the client account information comprises at least one service level parameter for determining whether a service level associated with processing the request is acceptable, the one or more processors further configured to:
compare the real-time service level to the at least one service level parameter; and
determine whether the real-time service level is acceptable based on the comparison.

20. The system of claim 19, the client comprising a customer and the one or more processors further configured to:
when it is determined that the real-time service level is unacceptable, determine a monetary value based on the unacceptable determination and a predetermined fee associated with processing the request, and
determine a chargeback for the customer based, at least in part, on the monetary value.

21. The system of claim 20, the one or more processors further configured to:
update an account balance for the customer based on the chargeback; and
communicate the real-time service level and the account balance to the customer.

22. The system of claim 14, wherein the one or more processors configured to monitor processing the request by the web-based application are further configured to receive, from at least one event tracer, at least one event tracing log that includes data regarding processing the request and wherein the one or more processors configured to determine a real-time service level based on the monitoring are further configured to correlate the data regarding processing the request.

23. The system of claim 22, wherein the data regarding processing the request includes data regarding identification of one or more processes associated with processing the request, start events associated with at least one of the one or more processes and end events associated with at least one of the one or more processes, and wherein the one or more processors configured to determine the real-time service level utilize, at least in part, the start events and the end events to determine the real-time service level.

24. The system of claim 14, wherein the one or more processors configured to intercept a request from a client are further configured to provide an HTTP module that monitors and detects communications to the web-based application.

25. A non-transitory computer readable medium storing computer executable instructions for service level processing of a web-based application associated with a web-based environment, the instructions configuring one or more processors when executed to:

intercept, at a management engine, a request from a client that is addressed to the web-based application, wherein the request is not addressed to the management engine;

identify, by the management engine, the client based, at least in part, on the request;

identify, by the management engine, the web-based application based, at least in part, on the request;

retrieving, by the management engine, predefined account information regarding the identified client;

determine, at the management engine, whether to process the request, wherein the determination is based, at least in part, on the predefined account information and the intercepted request;

allow the request to be processed by the web-based application when it is determined that the request is to be processed;

monitor, at the management engine, processing of the request by the web-based application to the client;

determine, at the management engine, a real-time service level for the processing of the request based on the monitoring; and assign a monetary value to the processing the request based, at least in part, on the predefined account information and the real-time service level.

26. A method for service level processing of a web-based application associated with a web-based environment comprising:

intercepting, at a management engine, a request from a client that is addressed to a server that provides the web-based application;

determining, by the management engine, whether the request includes an address for the client;

identifying, by the management engine, the client based on the address, when the request includes an address;

determining, by the management engine, whether a cookie can be retrieved from the client when the request does not include an address;

receiving, at the management engine, the cookie from the client when it is determined that a cookie can be retrieved from the client;

identifying, by the management engine, the client based on the cookie when a cookie is received from the client;

determining, by the management engine, whether the request includes a password when the request does not include an address for the client and a cookie cannot be retrieved from the client;

identifying, by the management engine, the client based on the password when the request includes a password;

identifying, by the management engine, the web-based application based, at least in part, on the request;

retrieving, by the management engine, predefined account information regarding the identified client;

determining, at the management engine, whether to process the request, wherein the determination is based, at least in part, on the predefined account information and the intercepted request;

allowing the request to be processed by the web-based application when it is determined that the request is to be processed;

monitoring, at the management engine, processing of the request by the web-based application;

determining, at the management engine, a real-time service level for the processing of the request based on the monitoring; and assigning a monetary value to the processing of the request based, at least in part, on the predefined account information and the real-time service level.

* * * * *